(12) United States Patent
Peele

(10) Patent No.: US 7,518,503 B2
(45) Date of Patent: Apr. 14, 2009

(54) PORTABLE A/V RELAY DEVICE

(75) Inventor: James C. Peele, Raleigh, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 372 days.

(21) Appl. No.: 11/306,023

(22) Filed: Dec. 14, 2005

(65) Prior Publication Data
US 2007/0135038 A1 Jun. 14, 2007

(51) Int. Cl.
*G08B 1/08* (2006.01)
(52) U.S. Cl. .............................. 340/539.11; 348/14.01; 725/81
(58) Field of Classification Search ............ 340/539.11; 348/14.01, 14.02, 14.03, 14.04, 14.05; 725/64, 725/81, 143
See application file for complete search history.

(56) References Cited

U.S. PATENT DOCUMENTS

| 5,613,190 | A * | 3/1997 | Hylton ........................ 725/81 |
| 6,263,503 | B1 * | 7/2001 | Margulis ...................... 725/81 |
| 6,476,825 | B1 * | 11/2002 | Croy et al. .............. 348/14.05 |
| 2002/0068600 | A1 * | 6/2002 | Chihara et al. ........... 348/14.02 |
| 2002/0135671 | A1 * | 9/2002 | Yang ....................... 348/14.01 |
| 2004/0049797 | A1 * | 3/2004 | Salmonsen .................. 725/81 |
| 2004/0150713 | A1 * | 8/2004 | Cheng ..................... 348/14.02 |
| 2005/0008074 | A1 | 1/2005 | Van Beek et al. |
| 2006/0077251 | A1 * | 4/2006 | Pulitzer ................... 348/14.01 |
| 2007/0200920 | A1 * | 8/2007 | Walker et al. ............ 348/14.01 |
| 2007/0256108 | A1 * | 11/2007 | Du Val et al. ................. 725/81 |

FOREIGN PATENT DOCUMENTS

| EP | 1195931 | 4/2002 |
| GB | 2410160 | 7/2005 |
| WO | 200072596 | 11/2000 |
| WO | 200772596 | 11/2000 |
| WO | 2004088983 | 10/2004 |

OTHER PUBLICATIONS

Sony Ericsson Mobile Communications AB, International Search Report, corresponding to International Patent Application No. PCT/US2006/033698, dated Feb. 6, 2008.
Sony Ericsson Mobile Communications AB, Written Opinion, corresponding to International Patent Application No. PCT/US2006/033698, dated Feb. 6, 2008.
Sony Ericsson Mobile Communications AB, International Preliminary Report on Patentability, corresponding to International Patent Application No. PCT/US2006/033698, dated May 30, 2008.

* cited by examiner

*Primary Examiner*—John A Tweel, Jr.
(74) *Attorney, Agent, or Firm*—Frederick D. Bailey; Moore & Van Allen, PLLC

(57) ABSTRACT

Disclosed is a means for receiving an Audio/Video (A/V) signal from an original A/V source and re-formatting and re-transmitting the A/V signal such that it can be displayed on a nearby portable mobile device.

13 Claims, 3 Drawing Sheets

PORTABLE A/V RELAY DEVICE

BACKGROUND

The present invention relates to a means for receiving an Audio/Video (A/V) signal from an original A/V source and re-formatting and re-transmitting the A/V signal such that it can be displayed on a nearby external playback device.

SUMMARY

The present invention is a portable A/V relay device for receiving and re-transmitting an A/V signal. An input module receives an original A/V signal from an original A/V source. An analog-to-digital converter coupled with the input module converts the original A/V signal to a digital A/V signal. A digital signal processor coupled with the analog-to-digital converter processes the digital A/V signal such that the digital A/V signal can be packetized and modulated onto a short range RF carrier. A short range RF transceiver coupled with the digital signal processor re-transmits the packetized and modulated digital A/V signal. A nearby external mobile device receives the re-transmitted A/V signal then decodes and outputs the A/V signal on a display and speakers.

The present invention can be implemented, at least in part, as a method or a computer program product embodied on a computer readable storage medium.

DETAILED DESCRIPTION

The present invention is directed toward providing a means of forwarding the A/V output from an original A/V source to a portable mobile communications device so that the viewer can enjoy the A/V output while moving about an area that may not have a direct line of sight with the intended A/V playback components.

For purposes of this description, original A/V sources include, but are not limited to, television receivers, cable television set-top receivers, satellite television set-top receivers, DVD players, VHS players, video cameras, and home theater components. These A/V sources when combined with a display and speakers provide a playback means for the original A/V signal. Most of the time the display and speakers are fixed relative to the receiver of the original A/V signal meaning that the viewer is obligated to remain in a limited viewing area to enjoy the A/V signal. The A/V signal can represent a television program, a motion picture, music, a home video, etc.

Thus the present invention will allow, for instance, a viewer to receive a cable television broadcast of a football game not only on their television but also on their mobile phone. The viewer can then take the mobile phone into another room of a house without missing any of the football game.

Figure 1:
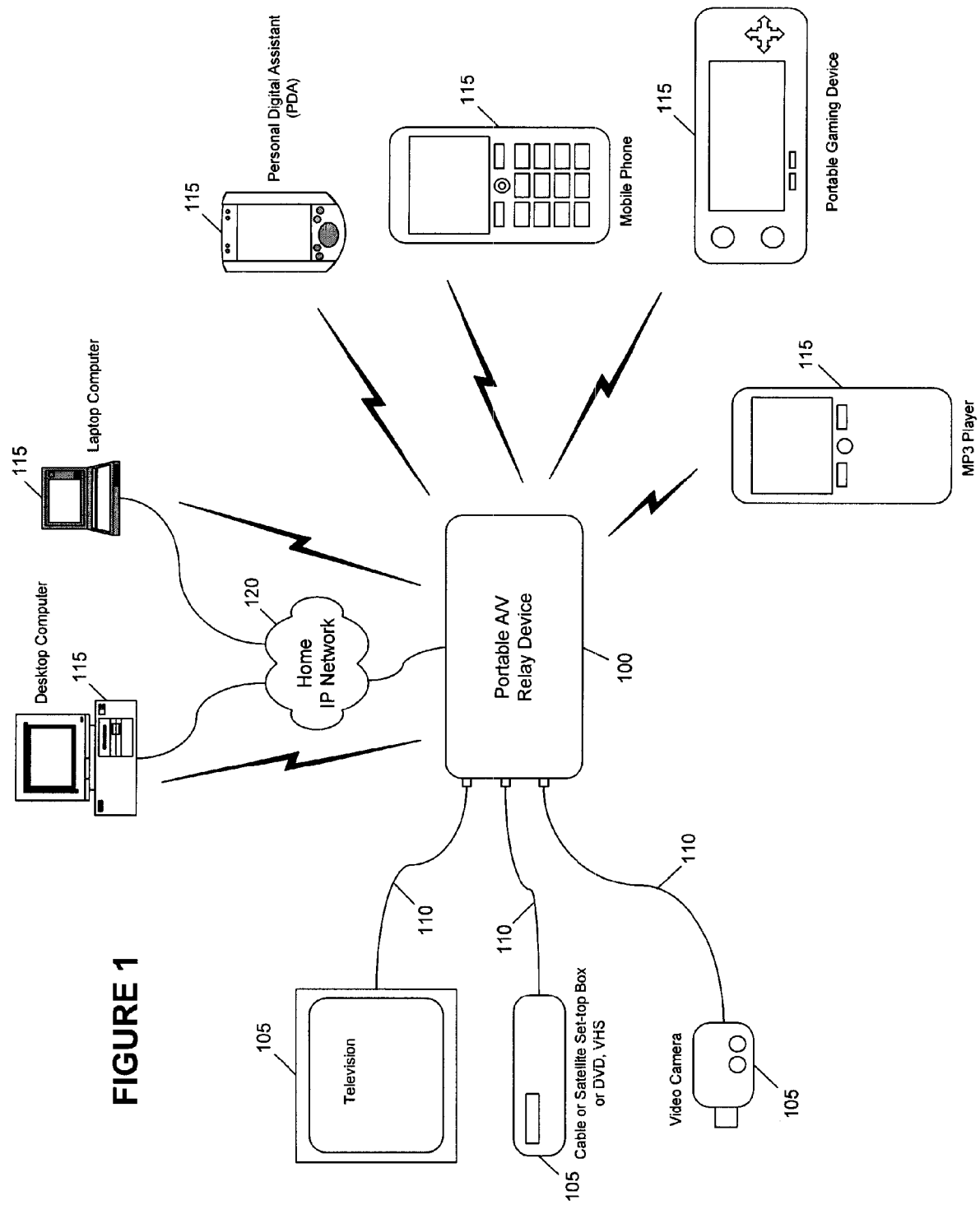
FIG. 1 is a block diagram illustration of an environment in which the present invention can operate.

FIG. 1 is a block diagram illustration of an environment in which the present invention can operate. A portable A/V relay device 100 receives A/V signals from a variety of sources 105 including, but not limited to, a television, a cable or satellite set-top receiver, or a video camera. The A/V sources 105 provide a direct feed of their output via A/V cables 110 to the portable A/V relay device 100. The A/V cables 110 can be of a variety of formats adapted to handle the A/V signal from the original A/V source(s) 105 including, but not limited to, coaxial cable, RCA jacks, composite video cables, fiber optic cables, or s-video cables.

Once the A/V signal is received into the portable A/V relay device 100 it is processed such that it can be re-transmitted over a new carrier to an external playback device 115. It can be re-transmitted wirelessly using a short range RF protocol such as Bluetooth™ or 802.11 WiFi. Or, it can be re-transmitted over an IP network via a network interface card to a home network 120.

The external playback device 115 that is to receive the re-transmitted A/V signal from the portable A/V relay device 100 can include but is not limited to, a desktop or laptop computer, a personal digital assistant (PDA), a mobile phone, a portable gaming device (e.g., Sony Playstation Portable), or an MP3 player with video display capability.

Figure 2:
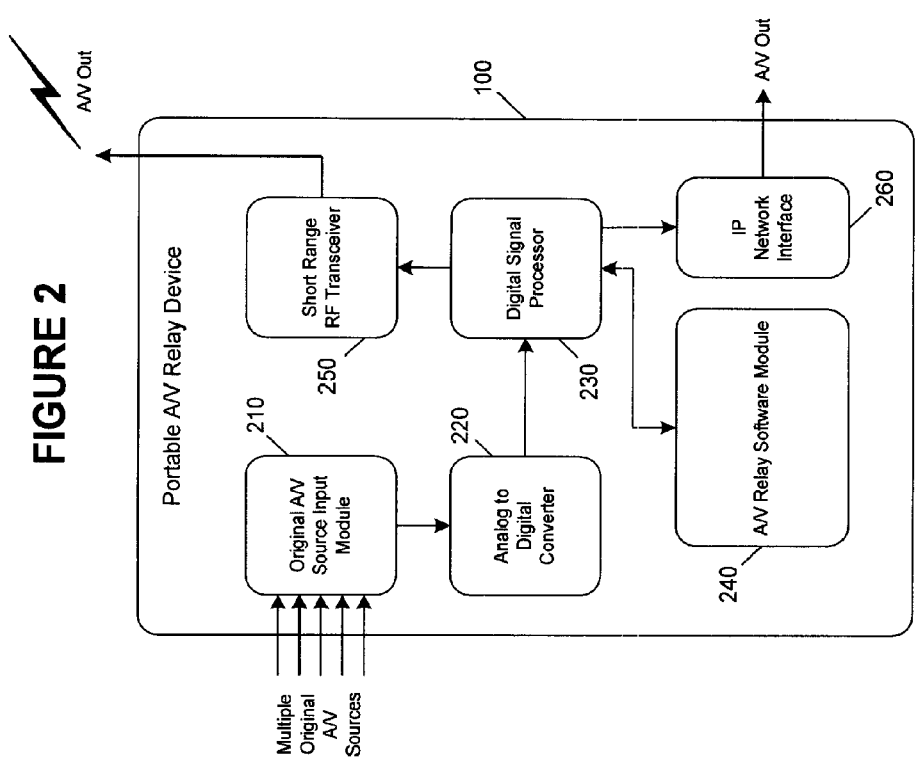
FIG. 2 is a block diagram of some of the components that comprise the portable A/V relay device of the present invention.

FIG. 2 is a block diagram of some of the components that comprise the portable A/V relay device 100 of the present invention. An input module 210 receives A/V signals from one or more original A/V sources. The received A/V signal is then passed through an analog-to-digital converter 220 before being sent to a digital processor 230. An A/V relay software module 240 under the control of the digital signal processor 230 guides the manipulation of the original A/V signal into a re-formatted A/V signal that will be output by the portable A/V relay device 100. The re-formatted A/V signal can be output wirelessly using a short range RF transceiver 250 or via an IP network interface 260 to a cable connecting the portable A/V relay device 100 with a home IP network 120.

The short range wireless RF transceiver 250 can be in the form of a Bluetooth™ module or an 802.11 WiFi module. However, other short range RF protocols not mentioned herein can be implemented by those of ordinary skill in the art.

Figure 3:
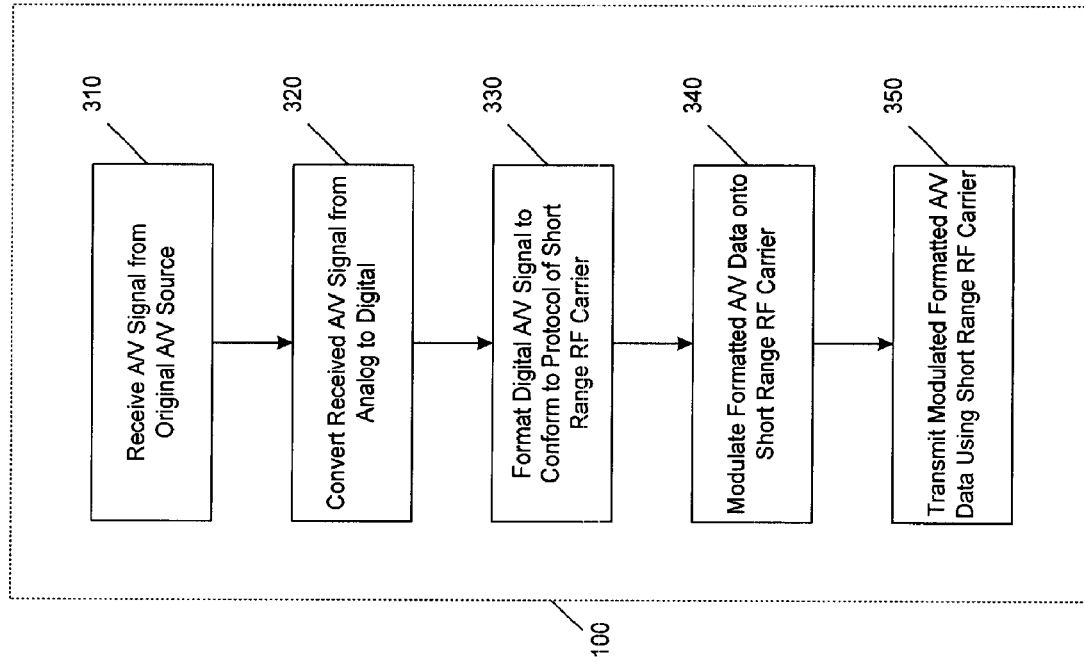
FIG. 3 is a flowchart illustrating a method of receiving, re-formatting and transmitting A/V data using a short range RF transceiver.

FIG. 3 is a flowchart illustrating a method of receiving, re-formatting and transmitting A/V data using a short range RF transceiver within the portable A/V relay 100. In block 310, an A/V signal is received from an original A/V source. In block 320, the received A/V signal is converted from analog to digital form. In block 330, the newly digitized A/V signal is processed by a digital signal processor to conform to the protocol and constructs of the short range RF carrier that will ultimately transmit the A/V signal to a nearby external device. In block 340, the formatted A/V signal is modulated onto the short range RF carrier. In block 350, the A/V signal is re-transmitted using the short range RF protocol.

The digital signal processor will format the A/V signal according to the display characteristics of the intended external playback device. For instance, if the original A/V signal was from a over-the-air, cable, or satellite television in an NTSC, PAL, or SECAM format and if the intended external playback device is capable of displaying an NTSC, PAL, or SECAM format, then the original A/V signal will be packetized and inserted into the payload frames of the short range RF carrier.

Sometimes, however, the intended external playback device may not be capable of displaying the A/V signal as it was originally formatted. In such cases, the digital processor within the portable A/V relay device 100 will re-format the A/V signal to a format compatible with the intended external playback device. Common video formats include, but are not limited to, MPEG and WMV.

Figure 4:
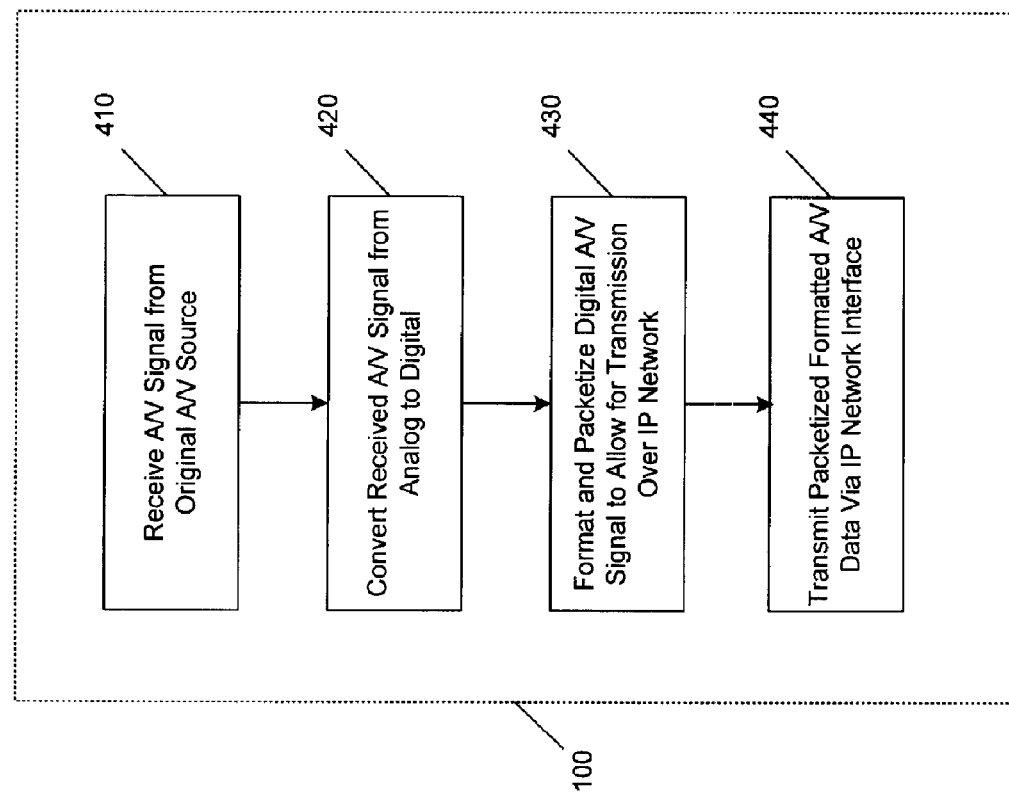
FIG. 4 is a flowchart illustrating a method of receiving, re-formatting and transmitting A/V data using an IP network interface.

FIG. 4 is a flowchart illustrating a method of receiving, re-formatting and transmitting A/V data using an IP network interface. In block 410, an A/V signal is received from an original A/V source. In block 420, the received A/V signal is converted from analog to digital form. In block 430, the newly digitized A/V signal is processed by a digital signal processor to conform to an IP protocol and allow for transmission over an IP network. In block 440, the formatted A/V signal is transmitted via the IP network interface to a home IP network that is coupled with an external playback device.

Figure 5:
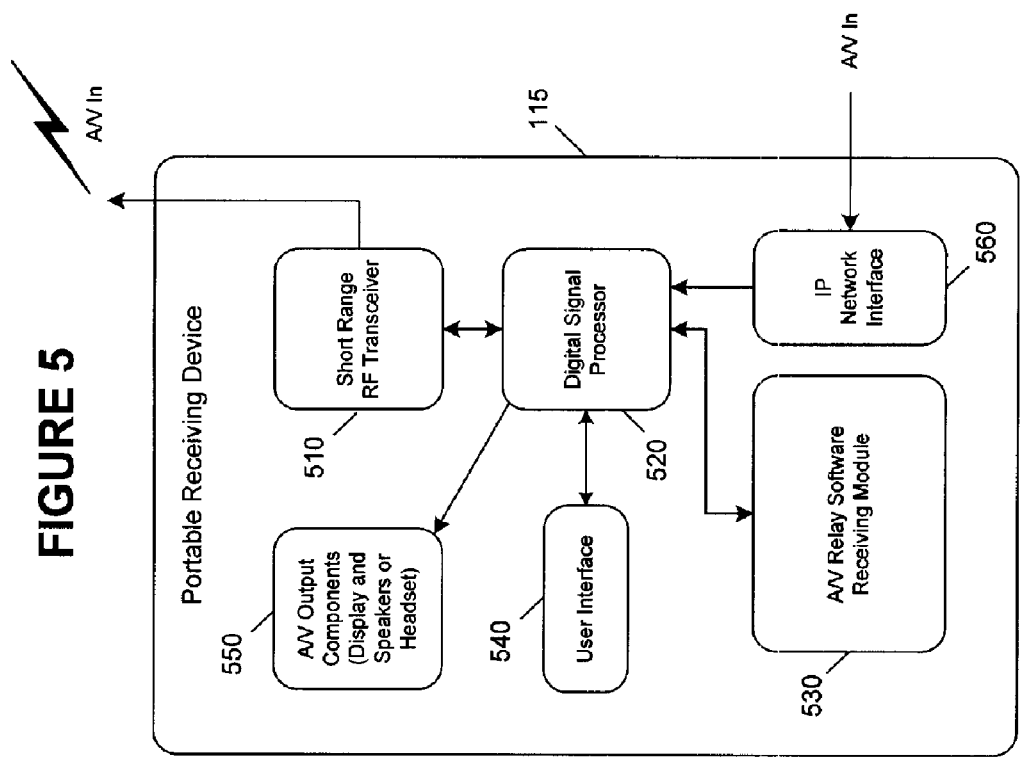
FIG. 5 is a block diagram of some of the components that comprise an external playback device for use with the portable A/V relay device of the present invention.

FIG. 5 is a block diagram of some of the components that comprise an external playback device 115 for use with the portable A/V relay device 100 of the present invention. The external playback device 115 includes a short range transceiver 510 compatible with the short range transceiver used by the portable A/V relay device 100 if the A/V signal was re-transmitted wirelessly. The A/V signal is received by the short range RF transceiver 510 and passed to a digital signal processor 520 under the control of an A/V relay software receiving module 530. The digital signal processor can include a digital-to-analog converter if the received A/V signal is to be displayed and heard as an analog signal.

A user interface 540 allows for input to be received pertaining to commands or instructions that may be needed to manipulate the received A/V signal. A/V output components 550 are disposed about the external playback device 115. The A/V output components 550 include, at a minimum, a display and speakers to provide an outlet for the A/V signal to be enjoyed by the user.

The A/V signal may have been received over an IP network interface 560 from a home IP network. In this scenario, the IP packets are forwarded to the digital signal processor 520 before being displayed and heard over the A/V output components 550.

Although the present invention has been shown and described in considerable detail with respect to an exemplary embodiment of the invention, it should be understood by those skilled in the art that it is not intended to limit the invention to specific embodiments disclosed. Various modifications, omissions, and additions may be made to the disclosed embodiments without materially departing from the novel teachings and advantages of the invention, particularly in light of the foregoing teachings.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A portable A/V relay device for receiving and re-transmitting an A/V signal, comprising:
   an input module for receiving an original A/V signal from an original A/V source;
   an analog-to-digital converter coupled with the input module that receives the original A/V signal from the input module and converts the original A/V signal to a digital A/V signal;
   a digital signal processor coupled with the analog-to-digital converter for receiving and processing the digital A/V signal such that the digital A/V signal can be packetized and modulated onto a short range RF carrier;
   a short range RF transceiver coupled with the digital signal processor for re-transmitting the packetized and modulated digital A/V signal; and
   an IP network interface configured to connect to an external IP network such that the portable A/V relay device can re-transmit the packetized and modulated digital A/V signal over the external IP network.

2. The portable A/V relay device of claim 1 wherein the short range RF transceiver is a Bluetooth™ transceiver.

3. The portable A/V relay device of claim 1 wherein the short range RF transceiver is an 802.11 WiFi transceiver.

4. The portable A/V relay device of claim 1 wherein the input module can connect to a plurality of A/V sources.

5. The portable A/V relay device of claim 4 further comprising the portable A/V relay device re-transmitting the packetized and modulated digital A/V signal over the external IP network to an external playback device connected to the external IP network.

6. A method of receiving and re-transmitting an A/V signal from an original A/V source to an external A/V playback device, the method comprising:
   receiving an original A/V signal from an original A/V source;
   converting the original A/V signal to a digital A/V signal;
   processing the digital A/V signal such that the digital A/V signal can be packetized and modulated onto a short range RF carrier; and
   re-transmitting the packetized and modulated digital A/V signal over an external IP network.

7. The method of claim 6, further comprising re-transmitting the packetized and modulated digital A/V signal using a short range RF transceiver, wherein the short range RF transceiver is a Bluetooth™ transceiver.

8. The method of claim 6, further comprising re-transmitting the packetized and modulated digital A/V signal using a short range RF transceiver, wherein the short range RF transceiver is an 802.11 WiFi transceiver.

9. A method of receiving and re-transmitting an A/V signal from an original A/V source to an external A/V playback device, the method comprising:
   receiving an original A/V signal from an original A/V source;
   converting the original A/V signal to a digital A/V signal;
   processing the digital A/V signal such that the digital A/V signal can be packetized into an IP data stream; and
   re-transmitting IP data stream over an IP network.

10. An apparatus comprising a computer readable storage medium with instructions stored therein, the instructions when executed causing a processing device to perform:
    receiving an original A/V signal from an original A/V source;
    converting the original A/V signal to a digital A/V signal;
    processing the digital A/V signal such that the digital A/V signal can be packetized and modulated onto a short range RF carrier; and
    re-transmitting the packetized and modulated digital A/V signal using a short range RF transceiver.

11. The apparatus of claim 10 wherein the short range RF transceiver is a Bluetoothr™ transceiver.

12. The apparatus of claim 10 wherein the short range RF transceiver is an 802.11 WiFi transceiver.

13. An apparatus comprising a computer readable storage medium containing instructions stored therein, the instructions when executed causing a processing device to perform:
    receiving an original A/V signal from an original A/V source;
    converting the original A/V signal to a digital A/V signal;
    processing the digital A/V signal such that the digital A/V signal can be packetized into an IP data stream; and
    re-transmitting IP data stream over an IP network.

* * * * *

UNITED STATES PATENT AND TRADEMARK OFFICE
CERTIFICATE OF CORRECTION

PATENT NO. : 7,518,503 B2 Page 1 of 1
APPLICATION NO. : 11/306023
DATED : April 14, 2009
INVENTOR(S) : James C. Peele It is certified that error appears in the above-identified patent and that said Letters Patent is hereby corrected as shown below:

Column 6, line 50, please delete "Bluetoothr™" and insert in place thereof
-- Bluetooth™ --

Signed and Sealed this

Second Day of June, 2009

JOHN DOLL
*Acting Director of the United States Patent and Trademark Office*